United States Patent

[11] 3,603,906

[72] Inventor Vernon G. H. Naylor
 St. Petersburg, Fla.
[21] Appl. No. 860,299
[22] Filed Sept. 23, 1969
[45] Patented Sept. 7, 1971
[73] Assignee Simmonds Precision Products, Inc.
 Terrytown, N.Y.

[54] ELECTRONIC SWEEP PROGRAMMER CIRCUIT FOR SUPPLYING COIL CURRENT IN TESTING A PISTON ASSEMBLY
3 Claims, 1 Drawing Fig.

[52] U.S. Cl.................................................. 331/111,
 307/228, 307/290, 307/291, 328/183, 331/143
[51] Int. Cl........................................................H03k 3/286,
 H03k 3/295
[50] Field of Search............................................. 331/111,
 143; 328/183; 307/228, 290, 291

[56] References Cited
UNITED STATES PATENTS

| | | | |
|---|---|---|---|
| 3,122,652 | 2/1964 | Kobbe et al.................. | 331/111 X |
| 3,156,875 | 11/1964 | Fiorino et al. ................ | 331/111 |
| 3,328,724 | 6/1967 | Way .............................. | 331/111 X |
| 3,376,518 | 4/1968 | Emmer......................... | 331/111 |

Primary Examiner—Roy Lake
Assistant Examiner—Siegfried H. Grimm
Attorney—Edwin E. Greigg ABSTRACT: An electronic programmer sweep circuit for testing a piston assembly which utilizes a flip-flop, a storage device and a feedback from the storage device for energizing a trigger circuit forming part of the flip-flop to supply a coil current increasing at a constant rate and similarly decreasing at a constant rate.

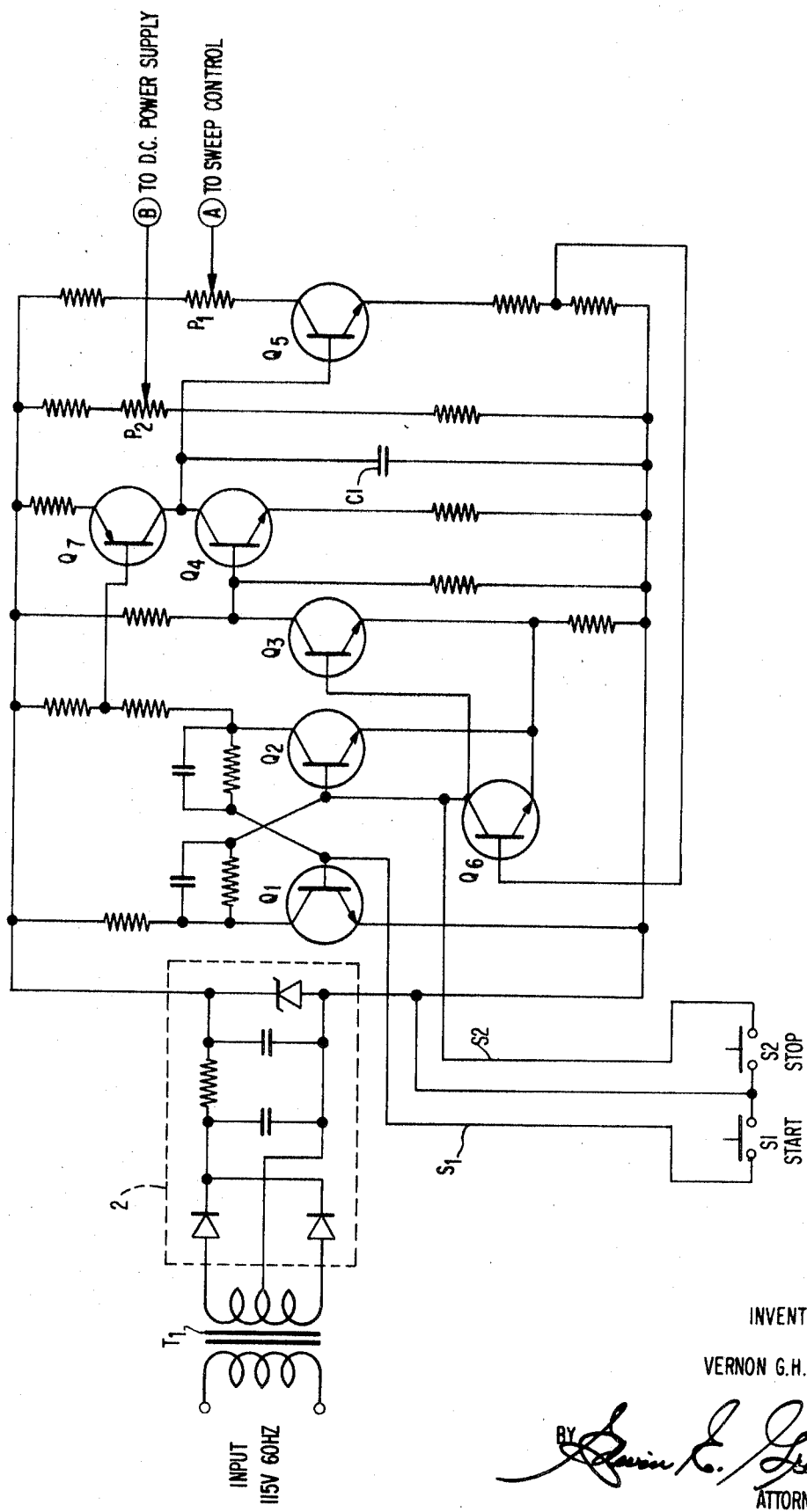

ELECTRONIC SWEEP PROGRAMMER CIRCUIT FOR SUPPLYING COIL CURRENT IN TESTING A PISTON ASSEMBLY

This invention relates to testing circuitry for a piston assembly in which an x-y recorder is used to plot pressure in p.s.i. against coil current in milliamps, and more particularly, to a solid-state electronic programmer for supplying the coil current by increasing at a constant rate from zero to a given value for a given period of time, and then reversing to return to zero for an equally given period of time.

Normally the testing of a piston assembly is accomplished by a motor-driven potentiometer system. This arrangement which is predominantly a mechanical system contributes greatly to electrical noise in addition to providing backlash which results in imperfect reversal as well as requiring considerable maintenance. The purpose of this invention is to provide electronic circuitry with superior current sweep programmer performance for replacing the mechanical system.

Accordingly, it is an object of this invention to provide an electronic sweep programmer circuit for supplying the coil current in testing a piston assembly.

It is another object of this invention to provide a solid-state sweep programmer circuit for replacing a motor-driven potentiometer system in testing a piston assembly which increases at a constant rate from zero to a given current value and reverses at a constant rate to zero.

It is yet another object of this invention to provide solid-state circuitry which provides superior current sweep programmer performance and which is free of electrical noise and provides improved stability and fast response.

According to one aspect of this invention utilizing the principles of this invention, there is provided a flip-flop circuit having a double transistor leg. The output of this double leg provides a constant current charge and discharge to a storage device. A portion of the change in voltage in the storage device is fed back to a Schmitt trigger circuit for controlling the discharge of the storage device. This feedback voltage is chosen so that it provides a desired amount of current to be fed to the coil of the piston.

Other objects and advantages will become apparent from the following study of the specification and drawing in which there is shown a schematic diagram of the circuitry constructed according to the principles of this invention.

As shown in the drawing, an input of 115 volts and 60 cycles is provided by the transformer T1. This alternating supply is converted by the rectifying circuit 2 to a regulated DC voltage. Connected to this voltage is a flip-flop circuit consisting of transistors Q1, Q2 and Q3 with the transistors Q2 and Q3 forming one leg of the flip-flop for isolation purposes. The outputs of this double leg are fed to complementary emitter follower transistors Q4 and Q7 to provide a constant current charge and discharge of a storage device such as capacitor C1, for example, in the order of 1,000 mfd. The change of voltage at C1 is seen at the base of transistor Q5 to provide an emitter current proportional to capacitor voltage. A portion of this emitter voltage is fed back to the base of transistor Q6 which forms a Schmitt trigger circuit with transistors Q2 and Q3.

With the transistor Q2 fired, the base of transistor Q7 is biased negatively to provide a constant current charging current through transistor Q7 to capacitor C1. Transistor Q3 being also fired holds transistor Q4 off until transistor Q6 fires, turning transistors Q2 and Q3 off and transistor Q1 on and turning transistor Q4 on and transistor Q7 off, thus starting the discharge of capacitor C1 through the transistor Q4. The portion of the transistor Q5 emitter voltage fed back to transistor Q6 is chosen to fire transistor Q6 when transistor Q5 collector output at "A" is sufficient to drive a power supply to provide a desired magnitude of current to the piston to be tested, for example, in the order of 180 ma. The potentiometer P1 at "A" allows for span adjustment. The potentiometer P2 and series resistor at "B" provides the needed voltage reference adjustment to the the power supply to provide zero adjustment.

Start-stop switch S1–S2 provides a means of reversing the flip-flop at any time to interrupt the cycle, either charging or discharging and return to the starting point without waiting the full time period of the program. Sometimes a sweep may be started before all conditions are set and it is therefore desirable to be able to start the cycle over again immediately.

What is claimed is:

1. An electronic sweep programmer circuit comprising a regulated supply voltage operatively connected to provide a fixed operating voltage to the circuit, a flip-flop circuit having a first and a second transistor leg, said second transistor leg formed by two transistors forming a double transistor leg, a pair of complementary emitter follower transistors, means operatively connecting the output of one transistor of the double transistor leg to one of the pair of emitter follower transistors, means operatively connecting the output of the other transistor of the double transistor leg to the other of the pair of emitter follower transistors, a capacitor connected to the complementary pair of transistors for receiving a constant current charge and discharge from said complementary pair of transistors, a transistor connected to said capacitor to provide an emitter current proportional to the capacitor voltage, said emitter current being connected to a Schmitt trigger circuit, and said trigger circuit connected to said flip-flop circuit for controlling the constant charge to said capacitor and initiating a constant current discharge of said current charge.

2. An electronic sweep programmer circuit comprising a supply voltage operatively connected to provide a fixed operating voltage to the circuit, a flip-flop transistor circuit having first and second transistors in one leg thereof, the output of said first and second transistors being connected to a pair of complementary emitter follower transistors, a capacitor connected to said complementary pair of transistors for receiving a constant current charge and discharge from said complementary pairs, the output of said capacitor being connected to a third transistor, the emitter of said third transistor being connected to a triggering circuit, and said triggering circuit connected to said flip-flop circuit for controlling the constant charging current to said capacitor and initiating a discharge of said current.

3. An electronic sweep programmer circuit for supplying a sweep current to a piston assembly comprising; a voltage supply, a flip-flop circuit connected to said supply and having one leg portion formed by a pair of transistors, storage device means connected to said one leg portion of said flip-flop circuit for receiving a constant current charge and discharge respectively from said pair of transistors, a feedback circuit connected to the output of said storage device means, said feedback circuit connected to a triggering circuit, said flip-flop circuit having said leg portion connected to said trigger circuit and being operatively connected for controlling the charging sweep current to said storage device means and initiating a discharge of said sweep current.